(12) United States Patent
Kouketsu et al.

(10) Patent No.: US 6,370,967 B1
(45) Date of Patent: Apr. 16, 2002

(54) TORQUE SENSOR WITH JOINT MEANS FOR PRODUCING A CONSISTENT MAGNETIC EFFECT

(75) Inventors: Yoshitaka Kouketsu; Daisuke Satoh; Hiroshi Fukasaku; Takeshi Harasawa; Katsufumi Tanaka; Yoichiro Kashiwagi; Yasuharu Odachi, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/256,814

(22) Filed: Feb. 24, 1999

(30) Foreign Application Priority Data

May 29, 1998 (JP) .......................................... 10-149097

(51) Int. Cl.$^7$ ................................................ G01L 3/10
(52) U.S. Cl. .................. 73/862.333; 73/862; 73/862.08; 73/862.331
(58) Field of Search ....................... 73/862.08, 862.333, 73/862.36, 862.336, 862.334

(56) References Cited

U.S. PATENT DOCUMENTS 4,616,512 A * 10/1986 Himmelstein et al. ... 73/862.36
5,646,356 A    7/1997 Ling et al.

FOREIGN PATENT DOCUMENTS

JP      59-77326      5/1984
JP      5-118938      5/1993

* cited by examiner

*Primary Examiner*—Benjamin R. Fuller
*Assistant Examiner*—Andre Allen
(74) *Attorney, Agent, or Firm*—Morgan & Finnegan, LLP

(57) ABSTRACT

A torque sensor having an improved detection accuracy is disclosed. The torque sensor includes a cylindrical stator. The stator is arranged to face a magnetostrictive member fixed to a shaft. The stator includes a stator body and two retainer rings. When assembling the stator body and the two retainer rings, a pair of exciting coils and a pair of detecting coils are accommodated in the inner wall of the stator. Joints between the stator body and the two retainer rings are not exposed to the inner surface of the stator.

19 Claims, 9 Drawing Sheets

TORQUE SENSOR WITH JOINT MEANS FOR PRODUCING A CONSISTENT MAGNETIC EFFECT

BACKGROUND OF THE INVENTION

The present invention relates to a magnetostrictive torque sensor that detects torque acting on a shaft by sensing magnetostrictive changes in magnetostrictive property.

For example, Japanese Unexamined Patent Publication No. 5-118938 and Japanese Unexamined Patent Publication No. 59-77326 disclose such magnetostrictive torque sensors.

As illustrated in FIG. 15, a prior art magnetostrictive torque sensor includes a housing 81, a shaft 83, a cylindrical magnetostrictive member 84 and a stator 85. The magnetostrictive member 84 is fitted about the shaft 83, and the stator 85 is fixed to the inner wall of the housing 81. The housing 81 is supported on the shaft 83 by a pair of bearings 82 to cover the shaft 83. The shaft 83 rotates relative to the housing 81 and the stator 85. The stator 85 is cylindrical and includes a pair of exciting coils 86 and a pair of detecting coils 87. The coils 86, 87 are located in the inner wall of the stator 85. The exciting coils 86 and the detecting coils 87 face the surface of the magnetostrictive member 84. When an alternating current is supplied to the exciting coils 86, the exciting coils 86 generate flux. The flux forms a magnetic circuit through the stator 85 and the magnetostrictive member 84.

The surface of the magnetostrictive member 84 includes two detection regions. Grooves 84a are formed in each region. The grooves 84a in one region are inclined by forty-five degrees relative to the axis, and the grooves 84a in the other region are inclined by minus forty-five degrees relative to the axis. When torque is applied to the shaft 83, a compressive force acts on one of the detection regions and a tensile force acts on the other region depending on the rotational direction of the shaft 83. A tensile force increases the magnetic permeability of the magnetostrictive member 84 and a compression force decreases the magnetic permeability of the magnetostrictive member 84. Changes in the magnetic permeability of the magnetostrictive member 84 change the voltages induced by the detecting coils 87. That is, the detecting coil 87 send varying voltage values to a processor 88. The processor 88 calculates the difference between the voltage values from the detecting coils 87. The processor 88 computes the torque applied to the shaft 83 based on the difference.

As illustrated in FIG. 15, the stator 85 is located close to the magnetostrictive member 84 to improve the sensitivity of the torque sensor. The coils 86, 87 are embedded in the inner wall of the stator 85. To facilitate the installation of the coils 86, 87, the stator 85 includes two semi-cylindrical pieces 85a. When installing the coils 86, 87, bobbins about which the coils 86, 87 are wound are attached to the inner wall of the stator 85. Thereafter, the pieces 85a are secured to each other with adhesive.

Since the stator 85 is divided into two pieces along a plane that includes the axis and since the non-conductive adhesive is located between the pieces 85a, eddy currents in the circumferential direction of the stator 85 are blocked by joints 85b.The eddy currents, which would otherwise adversely affect the sensitivity of the torque sensor, are reduced. This improves the sensitivity of the torque sensor. However, since the magnetic reluctance of the joints 85b is much greater than that of the other parts, the magnetic symmetry about the axis of the stator 85 is impaired. The lowered magnetic symmetry of the stator 85 causes the detection voltage of the torque sensor to change in accordance with the rotational position of the shaft 83. Therefore, even if there is no torque acting on the shaft 83, the torque sensor may erroneously detect that a torque is acting on the shaft 83.

Torque deforms the magnetostrictive member 84, and deformation of the member 84 changes the inductance of the coils. The torque sensor detects torque based on the changes of the inductance. However, the inductance also changes when the distance between the magnetostrictive member 84 and the coils 86, 87 changes. When the distance between the magnetostrictive member 84 and the coils 86, 87 changes, the torque sensor falsely detects torque even if there is no torque acting on the shaft 83. Therefore, it is imperative that the distance between the member 84 and the coils 86, 87 be constant to guarantee the precision of the torque sensor.

However, errors produced by assembling the stator 85 and the bearings 82 often displace the axis O1 of the shaft 83 from the axis O of the stator 85 (FIG. 17 illustrates the eccentricity in an exaggerated manner). The eccentricity causes the distance between the magnetostrictive member 84 and the coils 86, 87 to fluctuate as the shaft 83 rotates.

Due to a dimensional error created during manufacture, the cross-section of the shaft 83 may not be completely round. If the cross-section of the shaft 83 is not completely round, the distance between the magnetostrictive member 84 and the stator 85 further fluctuates, which is a further source of error.

Further, when joining the semi-cylindrical pieces 85a, the relative positions of the pieces 85a can be radially displaced relative to each other. This forms steps in the inner wall of the stator 85. The steps vary the distance between the stator 85 and the magnetostrictive member 84, which may cause the torque sensor to falsely detect torque.

To prevent false detection of torque, a dead zone, in which changes of inductance are not judged to be the result of torque applied to the shaft, has been widened. However, in an apparatus that activates an actuator based on detection of torque, such as a power steering apparatus, a widened dead zone extends the time lag from when torque starts acting on a shaft to when the actuator is activated. This deteriorates the response of the actuator.

SUMMARY OF THE INVENTION

Accordingly, it is an objective of the present invention to provide a torque sensor having an improved detectivity and sensitivity.

To achieve the foregoing and other objectives and in accordance with the purpose of the present invention, a torque sensor is provided. The torque sensor includes a magnetostrictive member and a stator facing the magnetostrictive member. The magnetostrictive member is strained by the torque applied to the shaft. An exciting coil and a detecting coil are accommodated in the inner surface of the stator. The exciting coil generates flux running through the magnetostrictive member. The flux varies in accordance with the strain of the magnetostrictive member. The detecting coil detects the flux variation. The cross-section of the stator's inner surface is substantially a round. The stator includes a plurality of stator pieces. The joint between the stator pieces substantially does not face the magnetostrictive member.

The features of the present invention that are believed to be novel are set forth with particularity in the appended claims. The invention, together with objects and advantages thereof, may best be understood by reference to the following description of the presently preferred embodiments together with the accompanying drawings.

DETAILED DESCRIPTION OF THE PREFERRED EMBODIMENTS

FIRST EMBODIMENT

A torque sensor according to a first embodiment of the present invention will now be described with reference to FIGS. 1 to 3.

Figure 3:
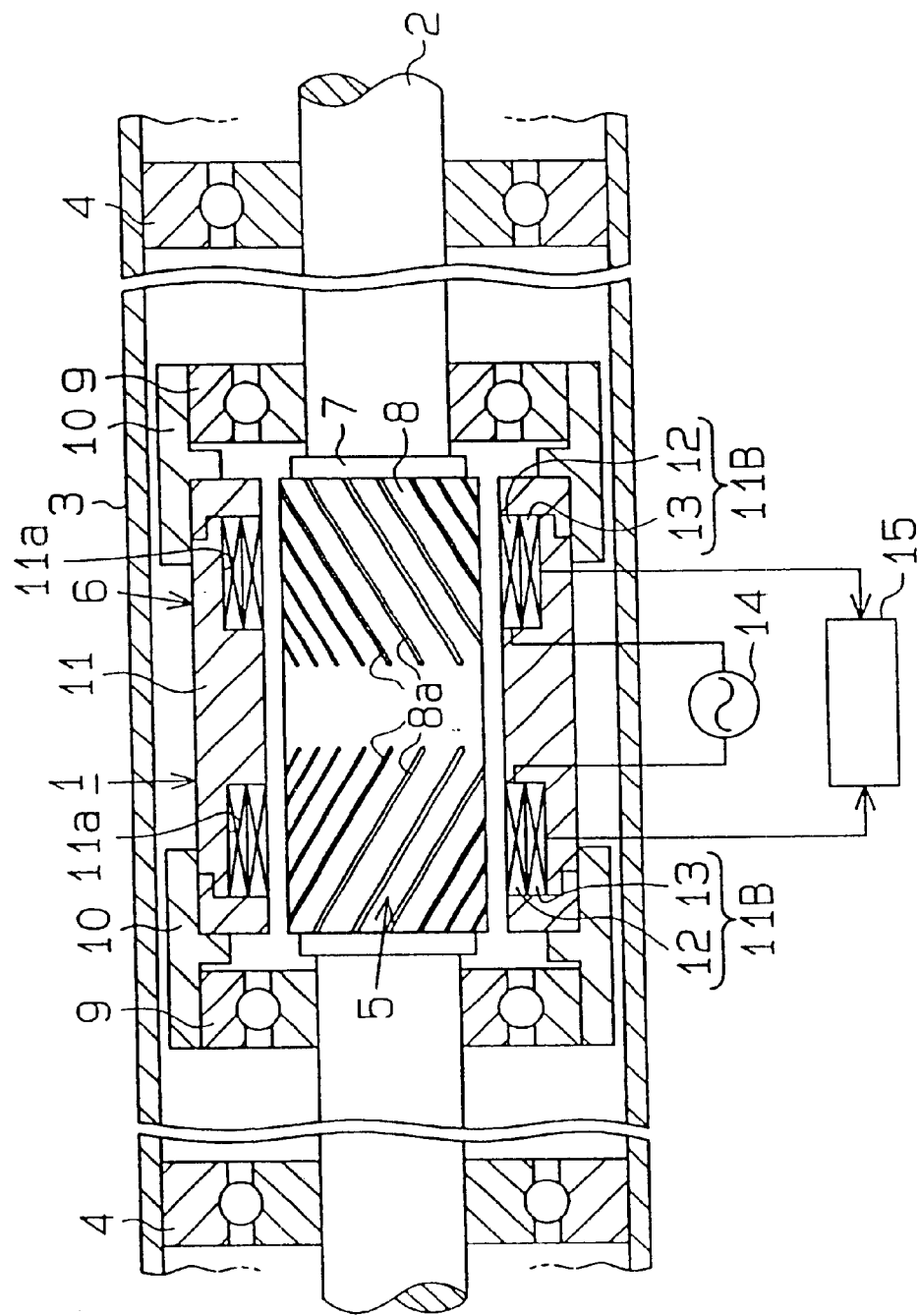
FIG. 3 is a cross-sectional view illustrating a torque sensor having the stator of FIG. 1 attached to a shaft.

As shown in FIG. 3, a cylindrical housing 3 rotatably supports a shaft 2 with bearings 4. A torque sensor 1 is supported on the shaft 2 by bearings 9. The shaft 2 rotates relative to the torque sensor 1 and the housing 3. The torque sensor 1 includes a detection member 5 and a detector 6. The detector 6 detects magnetic changes in the detection member 5.

The detection member 5 includes a sleeve 7 fitted about the shaft 2 and a magnetostrictive member 8 fitted about the sleeve 7. The sleeve 7 and the magnetostrictive member 8 are rotated integrally with the shaft 2. The magnetostrictive member 8 has a magnetostrictive property. The magnetostrictive member 8 can be made of a soft magnetic material having a high magnetic permeability such as permalloy and iron-nickel-chromium alloy. The magnetostrictive member 8 also can be made of magnetostrictive material including iron and aluminum or an amorphous magnetostrictive material. The surface of the magnetostrictive member 8 includes two regions, in which grooves 8a are formed. The grooves 8a are equally spaced apart in the circumferential direction. The grooves 8a in one of the regions are inclined by forty-five degrees relative to the axis, and the grooves 8a in the other region are inclined by minus forty-five degrees relative to the axis.

The detector 6 includes a cylindrical stator 11, a pair of exciting coils 12, a pair of detecting coils 13, an alternating-current power supply 14 and a processor 15. The stator 11 is held between a pair of retainers 10. Each retainer 10 is rotatably supported on the shaft 2 by one of the radial bearings 9. Two annular grooves 11a are formed in the inner wall of the stator 11 to face the magnetostrictive member 8. Each groove 11a accommodates a bobbin 11B. An exciting coil 12 and a detecting coil 13 are wound about each bobbin 11B. The exciting coil 11 is located inside the detecting coil 12. Since the stator 11 is supported on the shaft 2 by the two bearings 9, the stator 11 is coaxial to the magnetostrictive member 8 even if the housing 3 is eccentric relative to the shaft 2.

Each exciting coil 12 is connected to the alternating-current power supply 14. Each detecting coil 13 is connected to the processor 15. When an alternating-current is supplied to the exciting coils 12, the exciting coils 12 produce magnetic circuits through the stator 11 and the magnetostrictive member 8. Each magnetic circuit extends along the grooves 8a and is inclined by forty-five degrees or minus forty-five degrees relative to the axis. The magnetic flux, which runs along the magnetostrictive member 8, induces electromotive force in the detecting coils 13.

When torque acts on the shaft 2, one of the detection regions on the magnetostrictive member 8 receives a compression force and the other region receives a tensile forces depending on the direction of the torque. A tensile force increases the magnetic permeability of the magnetostrictive member 8 and a compression force decreases the magnetic permeability of the magnetostrictive member 8. Therefore, the induced electromotive force of each detecting coil 13 increases when the corresponding detection region receives a tensile force and decreases when the region receives a compression force.

The processor 15 includes a differential circuit and a rectifier circuit (neither is shown). The differential circuit computes the difference between the induced electromotive forces input from the detecting coils 13. The computed difference is rectified by the rectifier circuit. The processor 15 computes the magnitude and the direction of the torque based on the value and the sign of the rectified difference. The computation of the difference performed by the differential circuit compensates for external noise such as temperature changes, which improves the accuracy of torque detection.

Figure 1:
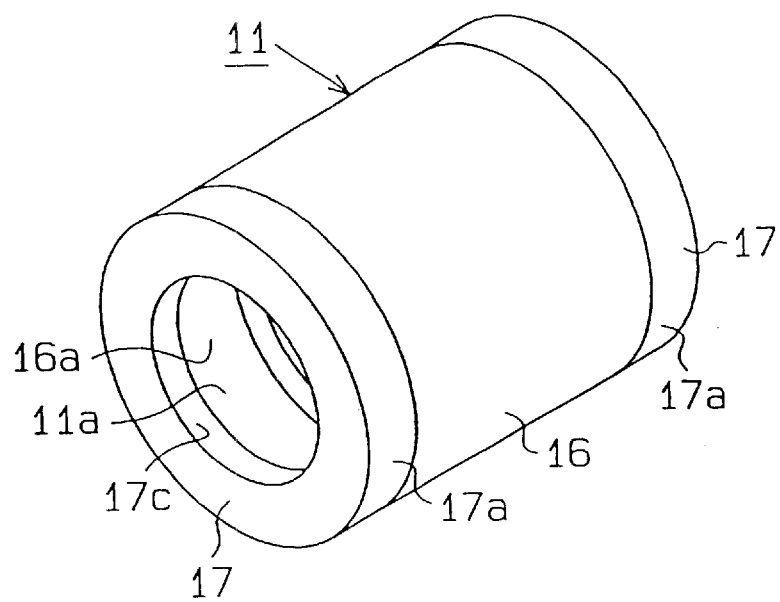
FIG. 1 is a perspective view illustrating a stator according to a first embodiment.
Figure 2:
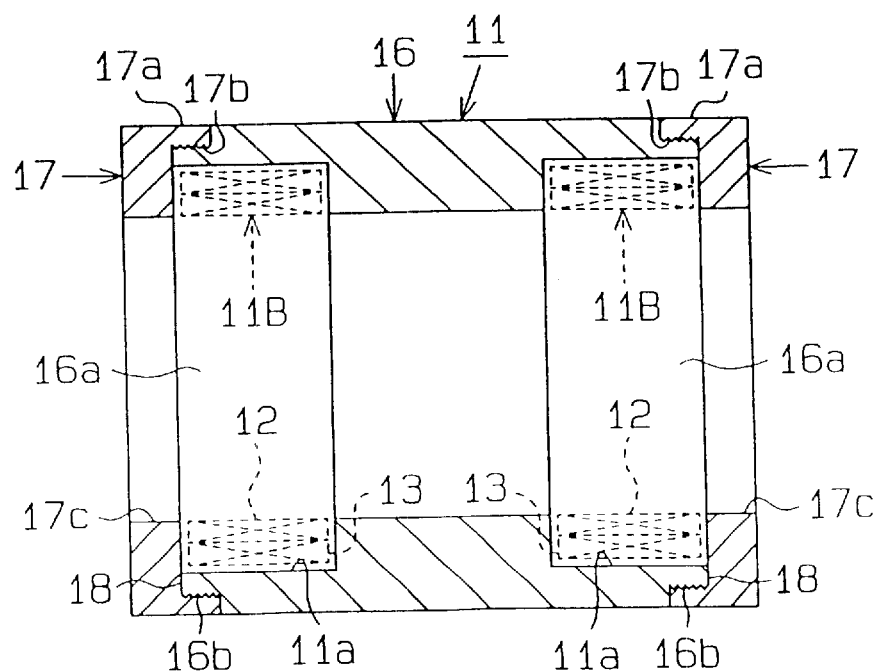
FIG. 2 is a cross-sectional view of the stator shown in FIG. 1.

As illustrated in FIGS. 1 and 2, the stator 11 includes a cylindrical stator body 16 and two retainer rings 17. An inner step 16a is formed at each end of the stator 16. The bobbins 11B are fitted in the steps 16a from the outside of the stator body 16. An outer step having threads 16b is formed in each end of the stator body 16. Each retainer ring 17 includes a cylindrical collar 17a extending axially from the radially outer region. Threads 17b, which are engaged with the threads 16b, are formed in the inner wall of each collar 17a. The outer diameter and the inner diameter of each retainer ring 17 are the same as those of the stator body 16. The inner surfaces of the stator body 16 and the retainer rings 17 are lathed to be substantially perfectly round.

The steps 16*a* and the retainer rings 17 define the two annular grooves 11*a*. When fixing the bobbins 11B in the grooves 11*a*, the bobbins 11B are inserted in the steps 16*a*. Then, the retainer rings 17 are engaged with the stator body 16.

The stator 16 and the retainer rings 17 are symmetrical with respect to any plane that includes the axis of the stator 11. Also, the rotational position of each retainer ring 17 relative to the stator body 16 is determined arbitrarily. The retainer rings 17 are identical and therefore interchangeable. Further, since the stator body 16 and each retainer ring 17 contact each other at the threads 16*b*, 17*b*, a contact area, or interface 18 therebetween is relatively large. Thus, the stator body 16 and each retainer ring 17 tightly contact each other.

The stator 11 is formed with one annular stator body 16 and two retainer rings 17. Also, as shown in FIG. 2, the contact areas 18 are radially spaced from the inner surface of the stator 11. Therefore, the magnetic reluctance of the stator 11 is substantially constant along its circumference. Further, since the stator body 16 is an integral cylindrical member, the inner wall can be lathed to perfect the roundness of its cross section. As a result, the distance between the magnetostrictive member 8 and the stator 11 does not fluctuate due to the shape of the inner surface of the stator 11. Therefore, the inductance of each detecting coil 13 is scarcely affected by the rotational position of the shaft 2. That is, the inductance of the coils 13 changes only when the shaft 2 receives torque. Accordingly, the reliability of the torque sensor 1 is improved.

The first embodiment has the following advantages.

The stator 11 is formed by coupling the annular stator 16 and the annular retainer rings 17. Contact area, which would disturb the flux, is not exposed in the inner surface of the stator 11. Therefore, the inductance of the detecting coil 13 is scarcely affected by the rotational position of the shaft 2. As a result, the inductance changes only when the shaft 2 receives torque. Accordingly, the detection accuracy of the torque sensor 1 is improved.

The inner surface of the stator body 16 and the retainer ring 17 are machined by a lathe such that the cross section of the stator 11 is substantially perfectly round. The distance between the stator 11 and the magnetostrictive member 8 is determined by the bearing 9 and the retainer 10 on the shaft 2. The distance between the stator 11 and the magnetostrictive member 8 remains substantially constant regardless of the rotational position of the shaft 2. Therefore, the inductance is less affected by the rotational position of the shaft 2, and the detection accuracy of the torque sensor 1 is improved.

Since erroneous detection of the torque sensor 1 caused by inductance changes due to the rotational position of the shaft 2 is prevented, the dead zone can be narrowed relative to a detection value. Therefore, small torques, which cannot be detected by a prior art torque sensor having wide dead zone, can be detected. Using the torque sensor of the illustrated embodiment in an apparatus having an actuator that is activated based on detection of torque improves the response of the actuator.

The stator 11 is formed by threading the retainer rings 17 to the stator body 16. The stator 11 therefore needs no adhesive and the assembly is simple. Also, the contact area is smaller than that of the prior art stator 85.

The stator 11 is assembled with the two retainer rings 17 and the stator body 16. The two retainer rings 17 are identical and the stator body 16 is symmetrical with respect to any plane that includes the axis of the stator 11.

Therefore, the stator body 16 does not need be oriented in a certain direction, and the retainer rings 17 are interchangeable. This simplifies the assembly of the stator 11. Further, since the stator 11 has relatively small number of parts, manufacturing the parts in the stator 11 is facilitated.

The stator 11 is rotatably supported on the shaft 2 by the bearings 9. Thus, in comparison to the prior art sensor in which the housing 3 directly supports the stator 11, the detection accuracy is improved. Further, the detection accuracy of the torque sensor is not affected by the machining accuracy of the inner surface of the housing 3. Therefore, a buyer of the torque sensor does not need to machine the inner surface of the housing 3 with a high accuracy.

Second Embodiment

A torque sensor according to a second embodiment of the present invention will now be described with reference to FIGS. 4 and 5. Since the torque sensor of the second embodiment is different from that of the first embodiment in the construction of the stator 11, the stator 11 will be mainly discussed below.

Figure 4:
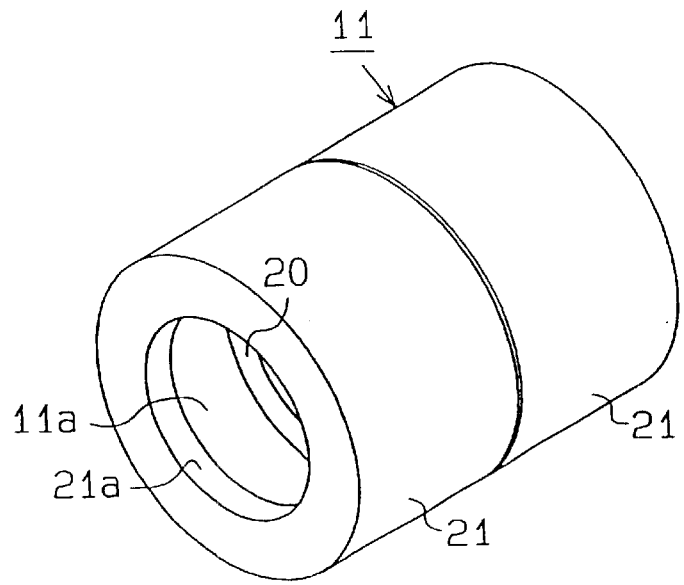
FIG. 4 is a perspective view illustrating a stator according to a second embodiment.
Figure 5:
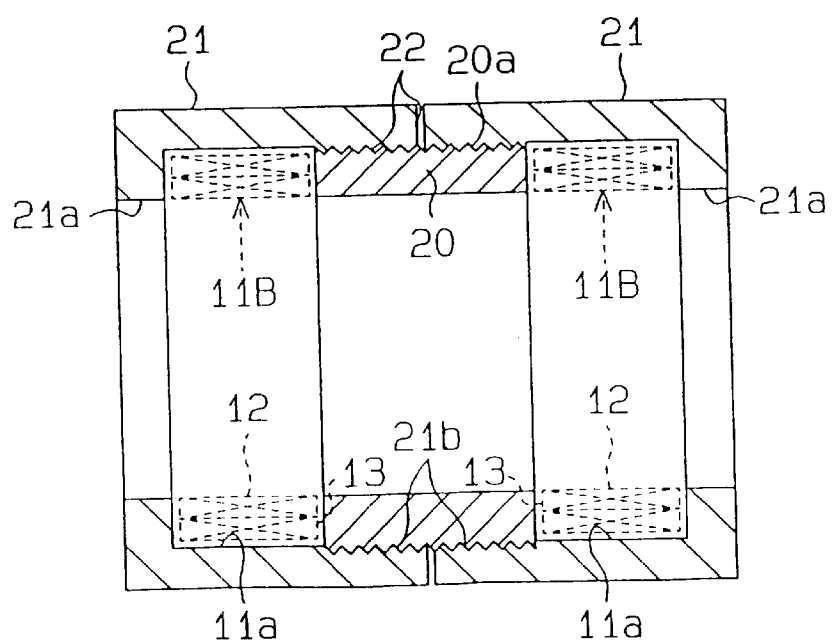
FIG. 5 is a cross-sectional view of a stator shown in FIG. 4.

As illustrated in FIGS. 4 and 5, a stator 11 includes an annular connector ring 20 and a pair of cylindrical stator bodies 21. The inner surfaces of the connector ring 20 and the stator bodies 21 are machined by a lathe such that the cross section of the connector ring 20 and the stator body 21 is a perfect circle. An outer thread 20*a* is formed on the entire circumferential surface of the connector ring 20. Each stator body 21 has an opening 21*a*. Each opening 21*a* is located at an end of the stator 11. The diameter of each opening 21*a* is equal to the inner diameter of the connector ring 20. The inner diameter of the stator 21, apart from the openings 21*a*, is substantially equal to the outer diameter of the bobbin 11B. An internal thread 21*b* is formed on the inner surface of each stator body 21 near the end opposite to the opening 21*a*. The external thread 20*a* of the connector ring 20 is engaged with the internal thread 21*b*.

When assembling the stator 11, the bobbin 11B is inserted in the stator body 21 from the end opposite to the opening 21*a*. Next, each stator body 21 is screwed to the connector ring 20. At this time, two annular grooves 11*a* are defined by the inner surface of the stator bodies 21 and the connector ring 20. A bobbin 11B is accommodated in each annular groove 11*a*.

The torque sensor according to the second embodiment has the following advantages.

Like the first embodiment, the torque sensor of the second embodiment improves the detection accuracy.

Since the connector ring 20 is symmetrical with respect to any plane that includes its axis, the connector ring 20 does not need be oriented in a certain direction. Since the two stators 21 have the same shape, they are interchangeable. Since the connector ring 20 and the stator bodies 21 are threaded to each other, the ring 20 and the stator bodies 21 closely contact one another over a relatively large area.

As shown in FIG. 5, the assembly of the stator 11 forms a contact area 22 between the two stator bodies 21. The contact area 22 includes the joint between the facing ends of the stator bodies 21 and the joint between the thread of the connector ring 20 and the thread of each stator body 21. However, the contact area 22 is not exposed to the inner surface of the stator 11, which faces the magnetostrictive member 8 across a predetermined distance. Further, since cross-section of the inner surface of the stator bodies 21 and the connector ring 20 is substantially perfectly round, the inner surface of the stator 11 has the cross-section that is substantially a complete circle. The distance between the stator 11 and the magnetostrictive member 8 is determined by the bearing 9 and the retainer 10 on the shaft 2. Thus, the distance between the magnetostrictive member 8 and the stator 11 is maintained substantially constant regardless of the rotational position of the shaft 2. As a result, the inductance of the detecting coil 13 does not change due to rotation of the shaft 2. That is, the inductance changes only when torque is applied to the shaft 2, which improves the detection accuracy of the torque sensor 1.

Third Embodiment

A third embodiment of the present invention will now be described with reference to FIGS. 6 to 8. The third embodiment is different from the first and second embodiments only in the structure of the stator 11. Therefore, the stator 11 will be mainly discussed below.

Figure 6:
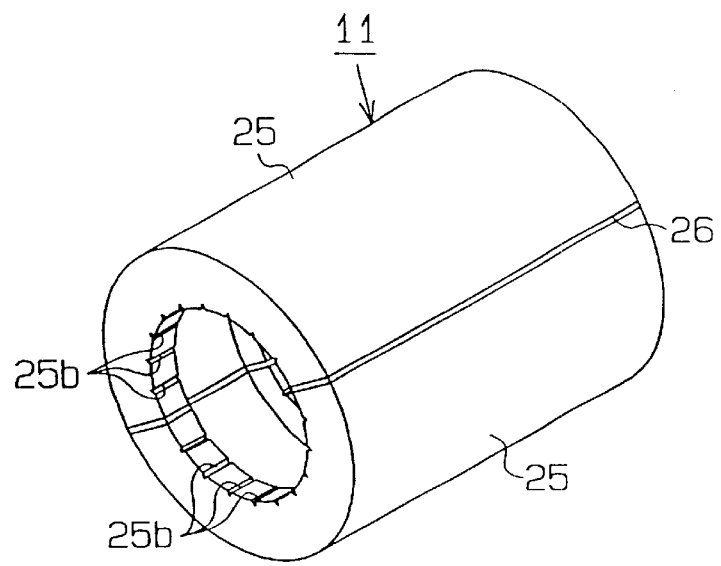
FIG. 6 is a perspective view illustrating a stator according to a third embodiment.
Figure 7:
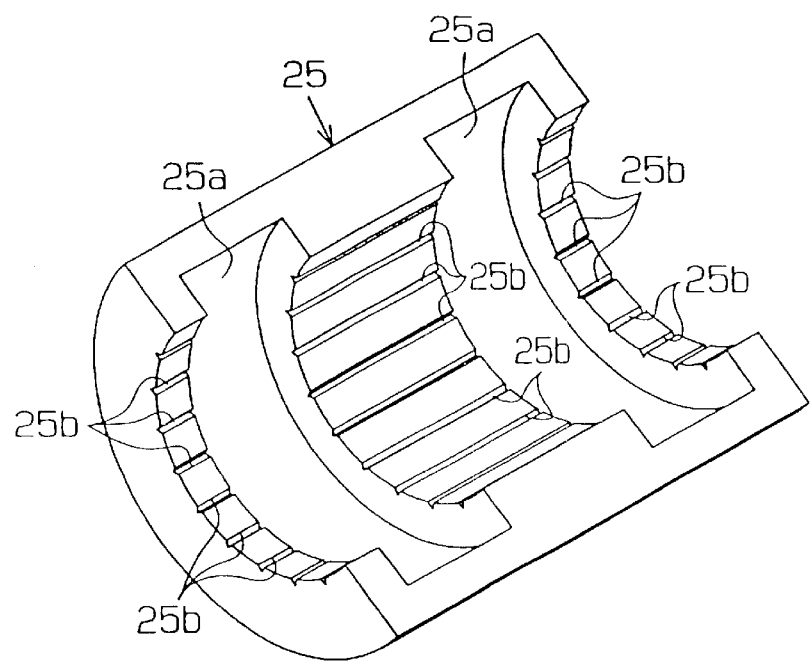
FIG. 7 is a perspective view illustrating a member in the stator of FIG. 6.

As shown in FIGS. 6 and 7, the stator 11 includes two semi-cylindrical or C-shaped pieces 25. The pieces 25 are joined along joints 26 with adhesive to form the stator 11. Each piece 25 has a pair of semi-circular recesses 25a formed in the inner surface. Grooves 25b are formed adjacent to each recess 25a. The grooves 25b and the joints 26 extend along the axis of the stator 11 and are spaced apart by equal angular intervals in the circumferential direction. The width of each groove 25b is substantially equal to the thickness of the joint 26. Each groove 25b has a depth of, for example, 1 to 90 micrometers, such that all or almost all the flux passes through the groove 25b. The grooves 25b are formed, for example, by knurling.

To assemble the stator 11, a bobbin 11B is fitted in the recess 25a of one of the pieces 25. Then, the other piece 25 is fitted to the first member 25. The pieces 25 are coupled together with adhesive.

Figure 8:
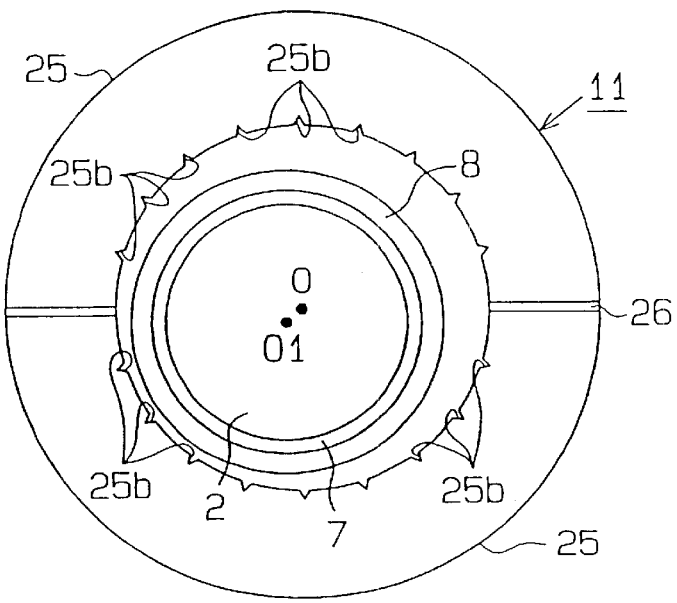
FIG. 8 is a cross-sectional view of a torque sensor having the stator of in FIG. 6.

As illustrated in FIG. 8, the axis O1 of the shaft 2 can be offset from the axis O of the stator 11, and the cross-section of the shaft 2 can be non-round. In these cases, the magnetostrictive member 8 fixed to the shaft 2 is eccentric relative to the stator 11 and the distance between the stator 11 and the magnetostrictive member 8 varies depending on the angular position of the stator 11.

The joints 26 create groove-like features on the inner surface of the stator 11. The stator 11 includes the grooves 25b, which extend parallel to the joint 26 and are equally spaced apart. Each groove 25b disturbs the distribution of the flux. Changes of the inductance due to the disturbance of the flux distribution substantially cancel the changes of inductance of the detecting coil 13 due to the rotational position of the shaft 2.

In other words, although the inner surface of the stator 11 does not form a perfect circle, the stator 11 can be considered to be a perfect circle in terms of its magnetic characteristics. Thus, the inductance is changed only by torque acting on the shaft 2. Accordingly, the detection accuracy of the torque sensor 1 is improved.

Since the stator 11 is manufactured by joining the two pieces 25, the relative positions of the pieces 25 may produce a step on the inner surface of the stator 11. However, the grooves 25b prevent the inductance from being affected by the magnetic resistance of the joint 26 when the shaft 2 rotates. Thus, the detection accuracy of the torque sensor 1 is improved compared to the prior art stator construction.

Fourth Embodiment

A fourth embodiment of the present invention will now be described with reference to FIGS. 9 and 10. The fourth embodiment is different from the first to third embodiments in the construction of the stator 11. Thus, the stator 11 will mainly discussed below.

Figure 9:
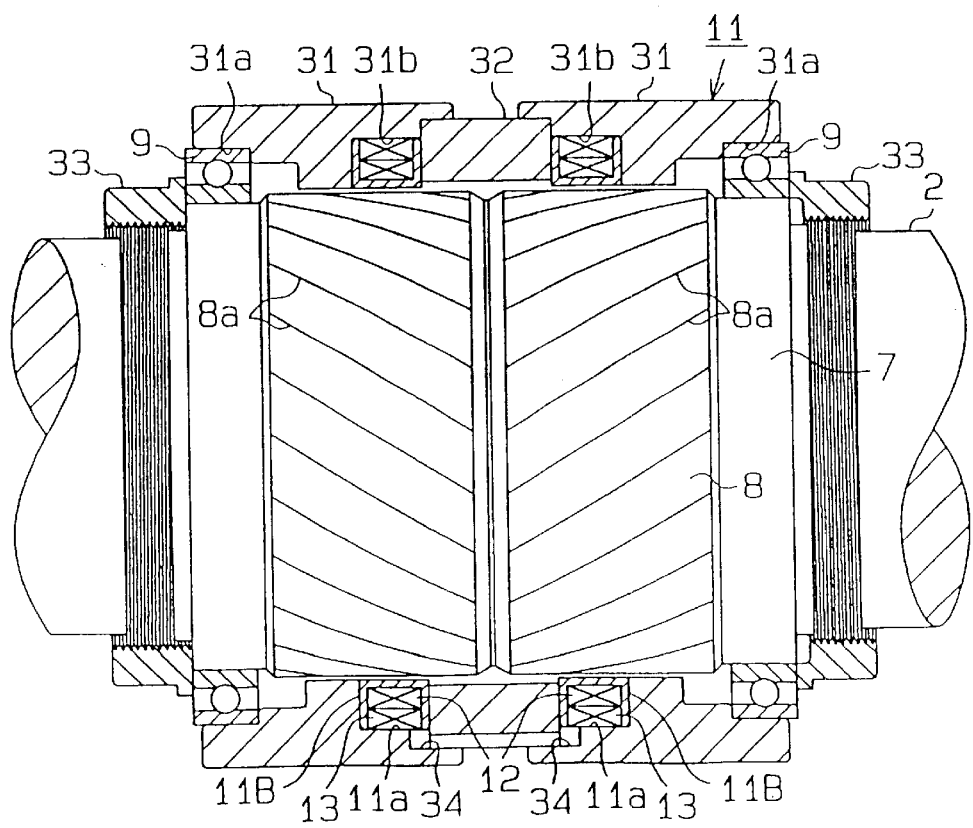
FIG. 9 is a cross-sectional view illustrating a torque sensor according to a fourth embodiment attached to a shaft.
Figure 10:
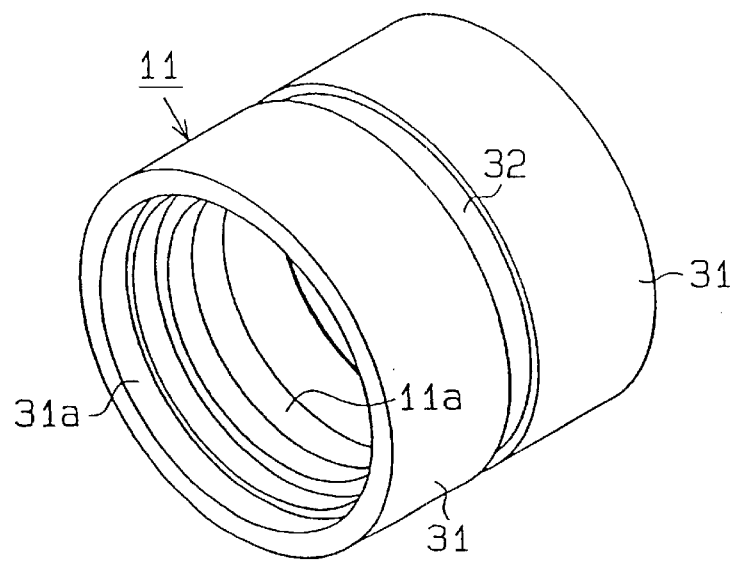
FIG. 10 is a perspective view of the stator shown in FIG. 9.

As shown in FIGS. 9 and 10, a stator 11 includes two cylindrical stator bodies 31 and a cylindrical connector ring 32. The two stator bodies 31 are fitted to the connector ring 32 to form the stator 11.

As shown in FIGS. 9 and 10, each stator body 31 includes an annular step 31a at the outer end. A bearing 9 is located between each annular step 31a and the outer surface of the sleeve 7. The bearings 9 allow the sleeve 7, which has the magnetostrictive member 8, to rotate relative to the stator 11. Two threaded fasteners 33 are engaged with the shaft 2. The two fasteners 33 hold the sleeve 7 and the bearings 9. That is, the fasteners 33 prevent the stator 11, the sleeve 7 and the bearing 9 from moving axially.

Two annular grooves 11a are defined by the connector ring 32 and the stator bodies 31. Specifically, each groove 11a is defined by a step 31b formed in the inner surface of the associated stator body 31 and the side wall of the connector ring 32. The annular grooves 11a form spaces for installing the bobbins 11B.

The inner surfaces of the stator bodies 31 and the connector ring 32 are machined by a lathe such that the cross section of the stator bodies 31 and the ring 32 form perfect circles. The two stator bodies 31 are identical. Therefore, the stator bodies 31 are interchangeable. The connector ring 32 is symmetric relative to any plane that includes its axis. Thus, the connector ring 32 does not need be oriented in a certain direction.

As shown in FIG. 9, wire passages 34 is formed in a part of the contact area between each stator body 31 and the connector ring 32. Wires (not shown) extend through the wire passages 34 to connect the bobbins 11B with an external power supply and the processor.

In addition to the advantages of the previous embodiments, the fourth embodiment has the following advantages.

Since each stator body 31 has the annular groove 31a, the stator 11 needs no retainer 10, which reduces the number of the parts. Accordingly, the number of joints between parts is reduced. As a result, displacement at joints is reduced. The stator 11 (the bobbins 11B) is therefore substantially coaxially assembled with the shaft 2.

A groove is formed in a part of the contact area between the stator bodies 31 and the connector ring 32 thereby drawing the wires from the bobbins 11B to the exterior. Therefore, holes need not be formed in a thin portion of the stator bodies 31 or of the connector ring 32. Thus, the strength of the stator 11 is not weakened by holes.

The stator 11 is formed by press fitting the stator bodies 31, the connector ring 32 and the bobbins 11B. This simplifies the assembly of the stator 11.

Fifth Embodiment

A fifth embodiment of the present invention will now be described with reference to FIGS. 11 and 12.

Figure 11:
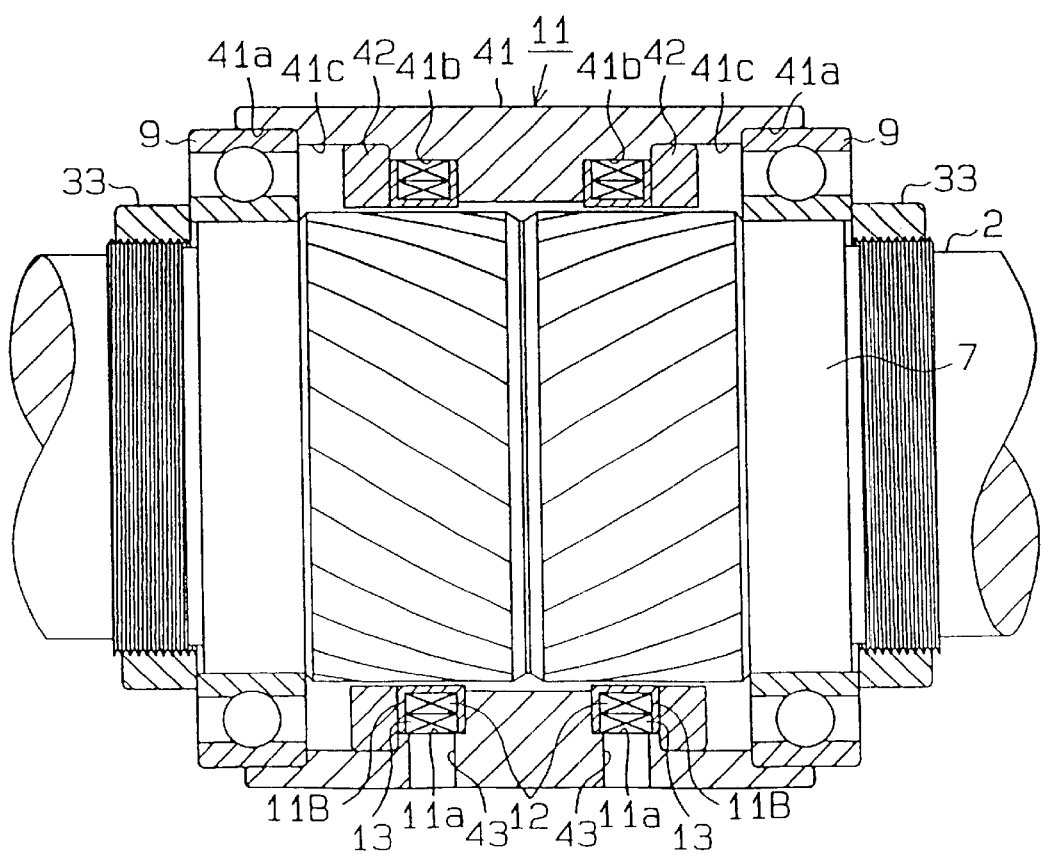
FIG. 11 is a cross-sectional view illustrating a torque sensor according to a fifth embodiment attached to a shaft.
Figure 12:
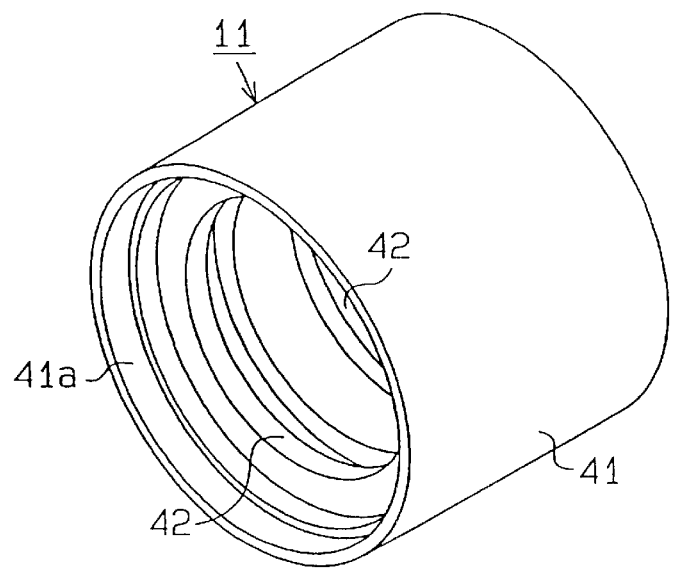
FIG. 12 is a perspective view of the stator shown in FIG. 11.

As shown in FIGS. 11 and 12, a stator 11 includes a cylindrical stator body 41 and two cylindrical retainer rings 42.

As shown in FIG. 11, three annular steps 41a, 41c and 41b are formed at each end of the stator 41 such that the diameters of the steps 41a, 41c, 41b decrease stepwise from the outer end of the stator body 41 toward its center. A bearing 9 is press fitted in each outermost annular step 41a. The bearings 9 are prevented from moving axially by two threaded fasteners 33 that are engaged with the shaft 2.

Each retainer ring 42 is press fitted into the annular step 41c. At this time, the stator body 41 and the two retainer rings 42 define two annular grooves 11a. Specifically, the annular grooves 11a are defined by the annular steps 41b and the side walls of retainer rings 42. Each groove 11a forms a space for installing one of the bobbins 11B. Two through holes 43 are formed in the stator body 41. Wires (not shown) extend through the through holes 43 to connect the bobbins 11B with an external power source and a processor. The inner surface of the retainer rings 42 and the stator body 41 are machined by a lathe so that the cross-sections of the ring 42 and the stator body 41 form perfect circles. The two retainer rings 42 are identical and therefore interchangeable. The stator body 41 is symmetrical with respect to any plane including its axis. Thus, the stator body 41 does not need be oriented in a certain direction.

In addition to the advantages of the previous embodiments, the fifth embodiment has the following advantages.

Since the stator 11 is directly supported by the bearings 9 at both ends, the axis of the shaft 2 is easily matched with the axis of the stator 11 at the ends of the stator 11. Accordingly, the distances from the magnetostrictive member and the bobbins 11B, which are positioned by the grooves 41b, are well balanced. This improves the detection accuracy of the torque sensor 1.

Sixth Embodiment

A torque sensor according to a sixth embodiment of the present invention will now be described with reference to FIGS. 13(a) and 13(b).

Figure 13A:
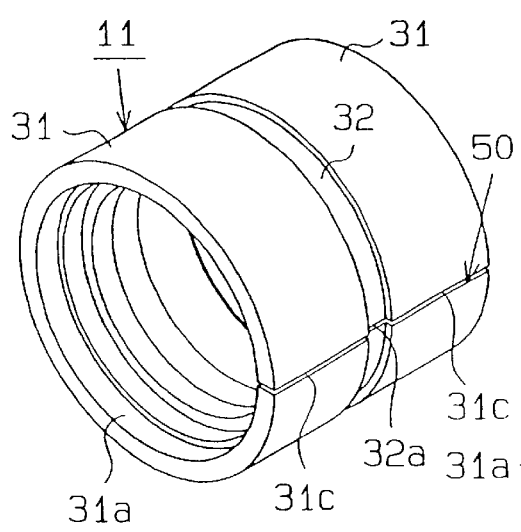
FIG. 13(a) is a perspective view illustrating a stator according to a sixth embodiment.
Figure 13B:
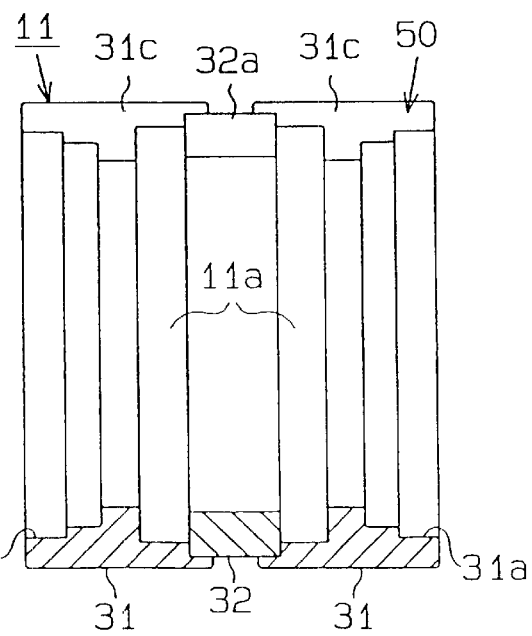
FIG. 13(b) is a cross-sectional view of the stator shown in FIG. 13(a)

As shown in FIGS. 13(a) and 13(b), a stator 11 of the sixth embodiment has the same structure as the stator 11 of the fourth embodiment shown in FIG. 9 except for a slit 50. The stator slit 50 is parallel to the axis of the stator 11. The stator slit 50 partitions the stator 11.

The stator 11 includes two stator bodies 31 and a connector ring 32. Each stator body 31 includes a slit 31c, which constitutes a part of the stator slit 50. The connector ring 32 includes a slit 32a, which constitutes a part of the stator slit 50. When assembling the stator bodies 31 and the connector ring 32, the slits 31c and 32a are aligned to form the continuous single slit 50. The slit 50 blocks eddy currents in the circumferential direction of the stator 11.

Seventh Embodiment

A torque sensor according to a seventh embodiment of the present invention will now be described with reference to FIGS. 14(a) and 14(b).

Figure 14A:
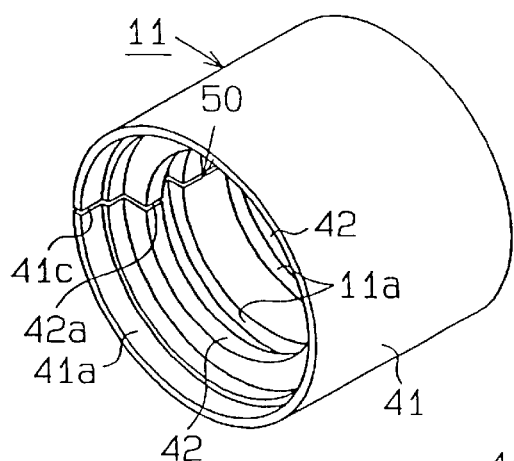
FIG. 14(a) is a perspective view illustrating a stator according to a seventh embodiment.
Figure 14B:
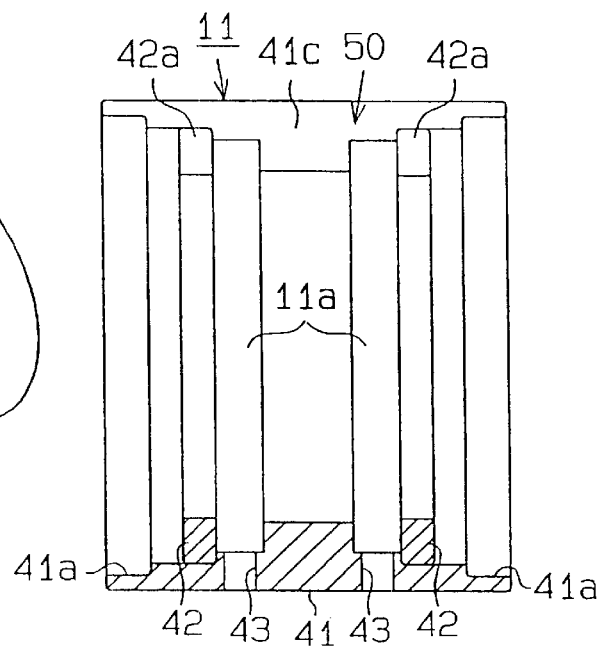
FIG. 14(b) is a cross-sectional view of the stator shown in FIG. 14(a)
Figure 15:
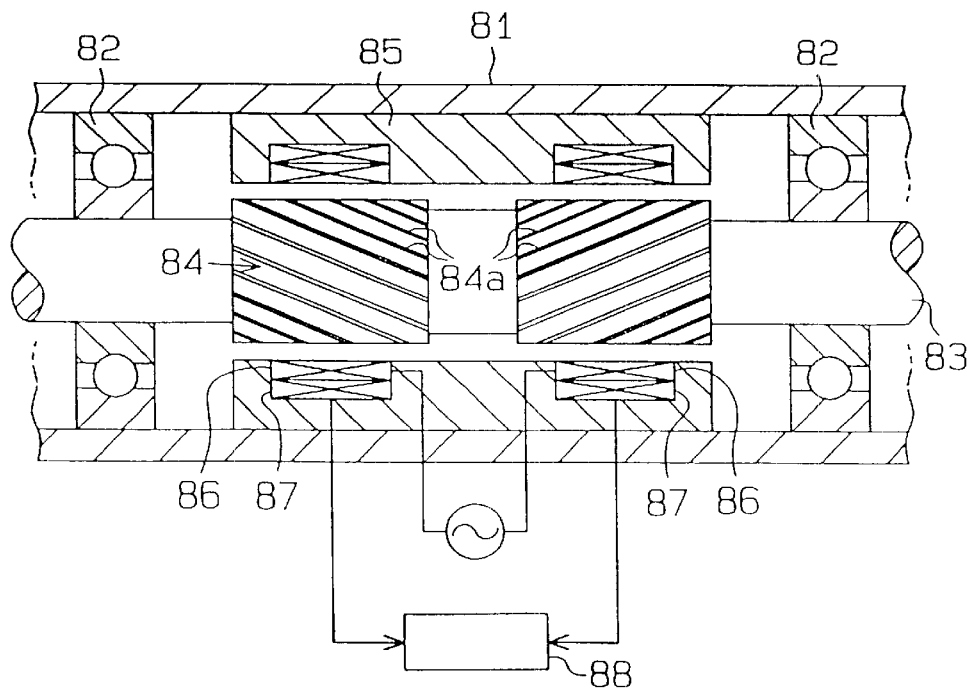
FIG. 15 is a cross-sectional view illustrating a prior art torque sensor.
Figure 16:
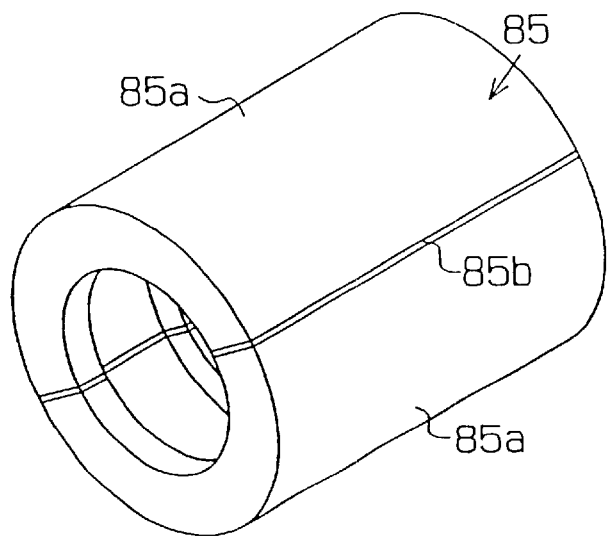
FIG. 16 is a perspective view illustrating a prior art stator.
Figure 17:
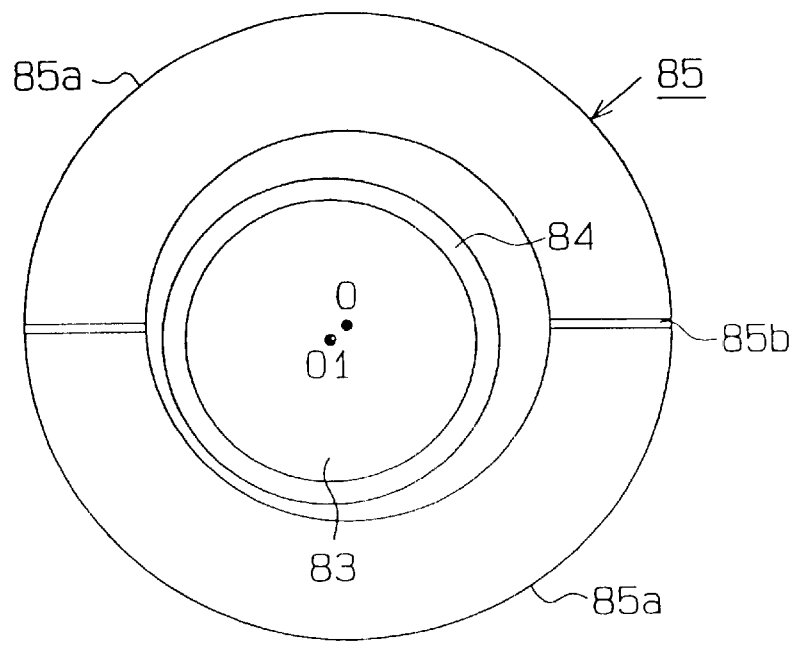
FIG. 17 is a cross-sectional view illustrating a prior art torque sensor.

As illustrated in FIGS. 14(a) and 14(b), a stator 11 of the seventh embodiment has the same structure as the stator 11 of the fifth embodiment shown in FIGS. 11 and 12 except for a slit 50. The stator slit 50 is parallel to the axis of the stator 11. The stator slit 50 partitions the stator 11.

The stator 11 includes a stator body 41 and retainer rings 42. The stator body 41 includes a slit 41c, which constitutes a part of the stator slit 50. Each retainer ring 42 includes a slit 42a, which constitutes a part of the stator slit 50. When assembling the stator body 41 and the retainer rings 42, the slits 41c and 42a are aligned to form a continuous single slit 50. The slit 50 blocks eddy currents in the circumferential direction of the stator 11.

The sixth and seventh embodiments have the same advantages as the fourth and fifth embodiment. In addition, the sixth and seventh embodiments have the following. advantage.

Since the slit 50 blocks eddy currents in the circumferential direction of the stator 11, power loss due to eddy currents is prevented. This improves the sensitivity of the torque sensor 1. Only one slit 50 is formed in the stator 11. Thus, the inner surface of the stator 11 is substantially a perfect circle.

The torque sensors according to the first to seventh embodiments may be modified as follows.

In the first and second embodiments, instead of joining the retainer rings 17 to the stator body 13 by threading, the retainer rings 17 may be press fitted to the stator body 13. Alternatively, the retainer rings 17 may be joined to the stator body 13 by threading and press fitting.

In the first, second and fourth to seventh embodiments, the assembling method of the stators is not limited. Press fitting, threading, adhesive may be used alone or in combination to assemble the stators. Parts of the stator may be welded to each other at a location where there is little flux.

In the third embodiment, the number of the grooves formed on the inner surface of the stator may be changed. For example, only two grooves may be formed on the inner surface of the stator. In this case, the grooves are spaced from the joints 26, which are exposed to the inner surface of the stator, by ninety degrees. That is, there may be four sections (the two joints and the two grooves) that disturb the distribution of flux. Four sections are sufficient for satisfactorily preventing torque detection from being affected by the rotational position of the shaft 2.

In the first, second and fourth to seventh embodiments, the parts forming the stator need not be cylindrical members that are divided by a plane perpendicular to the axis of the stator. For example, the parts may have an end surface that is inclined relative to the axis of the stator.

In the first, second and fourth to seventh embodiments, grooves like the ones in the third embodiment of FIG. 6 may be formed on the inner surface of the stator.

In the first, second and fourth to seventh embodiments, the stator may be divided into two or more pieces by planes that include the axis. In this case, the joints between the pieces are angularly spaced apart by equal intervals. Therefore, the torque sensor accurately detects torque regardless of the rotational position of the shaft 2.

The number of pieces of the stator may be changed. For example, in the third embodiment, the stator may be divided into three or more pieces by plains perpendicular to the axis.

The magnetostrictive member 8 may be formed as a smooth sleeve having no grooves 8a. The smooth sleeve may be detected by a cross head type pickup.

The sleeve 7 may be omitted and the magnetostrictive member may be directly mounted on the shaft 2.

Therefore, the present examples and embodiments are to be considered as illustrative and not restrictive and the invention is not to be limited to the details given herein, but may be modified within the scope and equivalence of the appended claims.

What is claimed:

1. A torque sensor for sensing torque applied to a shaft, the sensor comprising:

a magnetostrictive member fixed to the shaft, wherein the magnetostrictive member is strained by the torque applied to the shaft;

an exciting coil for generating flux in the magnetostrictive member, wherein the flux varies in accordance with the strain of the magnetostrictive member;

a detecting coil for detecting the flux variation;

a stator, which includes a plurality of cylindrical and annular components joined together, for retaining the exciting coil and the detecting coil such that the coils surround the magnetostrictive member, the stator having an inner surface, which has a circular cross-section; and joint means for joining the plurality of components and for producing a consistent magnetic effect of the coils at all angular locations so that a voltage induced in the detecting coil is unaffected by a rotational position of the magnetostrictive member with respect to the stator.

2. The torque sensor according to claim 1, wherein the stator is symmetrical relative to any plane that includes an axis of the stator.

3. The torque sensor according to claim 2, wherein the components are cylindrical, and wherein the stator is formed by joining the stator components endwise.

4. The torque sensor according to claim 3, wherein two annular grooves are formed in an inner wall of the stator to accommodate the exciting coil and the detecting coil, respectively, and wherein each annular groove is defined by more than one of the components.

5. The torque sensor according to claim 4, wherein the stator is formed with three stator components, and wherein the stator is supported on the shaft by at least one bearing such that the shaft rotates with respect to the stator.

6. The torque sensor according to claim 5, wherein the components include an outer cylindrical member and two inner annular members, and wherein the stator is supported by one bearing located between each end of the outer cylindrical member and the shaft, and each inner annular member is fitted within a corresponding end of the outer cylindrical member.

7. The torque sensor according to claim 5, wherein the components include one inner cylindrical member and two outer cylindrical members, wherein the bearing is one of two bearings, wherein one bearing is located between each of the outer cylindrical members and the shaft, and wherein each outer cylindrical member is joined to the inner cylindrical member endwise such that the inner cylindrical member is located between the outer cylindrical members.

8. The torque sensor according to claim 1, wherein the stator includes a slit that is parallel to an axis of the stator.

9. The torque sensor of claim 1, wherein the joint means includes a plurality of grooves that are parallel to an axis of the shaft formed on the inner surface of the stator.

10. A torque sensor for sensing torque applied to a shaft, the sensor comprising:
   a magnetostrictive member fixed to the shaft, wherein the magnetostrictive member is strained by the torque applied to the shaft;
   an exciting coil for generating flux running through the magnetostrictive member, wherein the flux varies in accordance with the strain of the magnetostrictive member;
   a detecting coil for detecting the flux variation;
   a stator, which includes a plurality of components joined together, for retaining the exciting coil and the detecting coil such that the coils surround the magnetostrictive member, the stator having an inner surface that is substantially consistent in an angular direction about an axis of the shaft, which eliminates or cancels effects on inductance in the detecting coil caused by structural features of the stator.

11. The torque sensor according to claim 10, wherein the stator is symmetrical relative to any plane that includes the axis of the stator.

12. The torque sensor according to claim 11, wherein the components are cylindrical, and wherein the stator is formed by joining the stator components endwise.

13. The torque sensor according to claim 12, wherein two annular grooves are formed in an inner wall of the stator to accommodate the exciting coil and the detecting coil, respectively, and wherein each annular groove is defined by more than one of the components.

14. The torque sensor according to claim 13, wherein the stator is formed with three stator components, and wherein the stator is supported on the shaft by at least one bearing such that the shaft rotates with respect to the stator.

15. The torque sensor according to claim 14, wherein the components include an outer cylindrical member and two inner annular members, and wherein the stator is supported by one bearing located between each end of the outer cylindrical member and the shaft, and each inner annular member is fitted within a corresponding end of the outer cylindrical member.

16. The torque sensor according to claim 14, wherein the components include one inner cylindrical member and two outer cylindrical members, wherein the stator is supported by one bearing located between each of the outer cylindrical members and the shaft, and wherein each outer cylindrical member is joined to the inner cylindrical member endwise such that the inner cylindrical member is located between the outer cylindrical members.

17. The torque sensor according to claim 10, wherein the stator includes a slit that is parallel to the axis of the stator.

18. The torque sensor of claim 10, wherein the inner surface of the stator includes a plurality of grooves that are parallel to the axis of the shaft.

19. The torque sensor of claim 10, wherein the stator is formed by a plurality of identical C-shaped members joined together along a plurality of joints, wherein inner portions of the joints form joint grooves on an inner surface of the stator, and wherein the inner surfaces of each C-shaped member include a plurality of regularly spaced grooves that are parallel to the joint grooves and face the magnetostrictive member, wherein the regularly spaced grooves and the joint grooves produce a consistent pattern on the inner surface of the stator.

* * * * *

UNITED STATES PATENT AND TRADEMARK OFFICE
CERTIFICATE OF CORRECTION

PATENT NO.     : 6,370,967 B1
DATED          : April 16, 2002
INVENTOR(S)    : Kouketsu et al.

It is certified that error appears in the above-identified patent and that said Letters Patent is hereby corrected as shown below:

Column 1,
Lines 56-57, please delete the hard return after "adhesive.", and continue with "Since the stator …" as a new sentence in the same paragraph;

Column 5,
Lines 14-15, please delete "a contact area, or interface 18" and insert therefor -- a contact area 18, or interface, --;

Column 5, line 67, Column 6, line 1,
Please delete the hard return after "stator 11.", and continue with "Therefore,…" as a new sentence in the same paragraph;

Column 9,
Lines 56-57, please delete "following. advantage" and insert therefor -- following advantage --.

Signed and Sealed this

Tenth Day of September, 2002

*Attest:*

JAMES E. ROGAN
*Director of the United States Patent and Trademark Office*

*Attesting Officer*